United States Patent [19]

Shimada

[11] Patent Number: 5,065,644
[45] Date of Patent: Nov. 19, 1991

[54] COUNTERBALANCE MECHANISM FOR INTERNAL COMBUSTION ENGINE

[75] Inventor: Toshio Shimada, Wako, Japan

[73] Assignee: Honda Giken Kogyo Kabushiki Kaisha, Tokyo, Japan

[21] Appl. No.: 376,082

[22] Filed: Jul. 5, 1989

[30] Foreign Application Priority Data

Jul. 6, 1988 [JP] Japan ................. 63-169390

[51] Int. Cl.$^5$ ............................ F16C 3/04; F02B 75/06
[52] U.S. Cl. ..................... 74/603; 123/192 B
[58] Field of Search .................. 123/192 B, 192 R; 74/603, 604

[56] References Cited

U.S. PATENT DOCUMENTS

| | | | |
|---|---|---|---|
| 4,648,359 | 3/1987 | Ito | 123/192 B X |
| 4,722,308 | 2/1988 | Wall | 74/603 X |
| 4,741,303 | 5/1988 | Kronich | 123/192 B |
| 4,800,852 | 1/1989 | Kandler | 74/604 X |
| 4,856,486 | 8/1989 | Mori et al. | 123/192 B X |
| 4,936,268 | 6/1990 | Randle | 123/192 B |

FOREIGN PATENT DOCUMENTS 2284802  4/1976 France .................. 123/192 B
58-39863 3/1983 Japan .

*Primary Examiner*—Vinh T. Luong
*Attorney, Agent, or Firm*—Armstrong, Nikaido, Marmelstein, Kubovcik & Murray

[57] ABSTRACT

An internal combustion engine has a crankshaft, a clutch, and a transmission including a main shaft rotatable by the crankshaft through the clutch and a countershaft rotatable by the main shaft through gears. A counterbalance mechanism includes at least a primary counterweight rotatable in synchronism with the crankshaft, and a hollow shaft rotatably supported concentrically on the main shaft, the primary counterweight being integrally mounted on the hollow shaft, the clutch being corotatably mounted on the hollow shaft and operatively coupled to the crankshaft at the same speed as and in the opposite direction to the crankshaft.

10 Claims, 7 Drawing Sheets

5,065,644

COUNTERBALANCE MECHANISM FOR INTERNAL COMBUSTION ENGINE

BACKGROUND OF THE INVENTION

1. Field of the Invention

The present invention relates to a counterbalance mechanism for use in an internal combustion engine.

2. Description of the Relevant Art

Counterbalance mechanisms for reducing the vibrations of some internal combustion engines while the engines are in operation include a primary counterweight which is rotated at the same speed as and in the opposite direction to the crankshaft so as to reduce a primary vibration. The counterbalance mechanisms may also include a secondary counterweight which is rotated at a speed twice that of the crankshaft for lowering a secondary vibration.

One counterbalance mechanism, particularly one having a primary counterweight, is disclosed in Japanese Laid-Open Patent Publication No. 58-39863, for example. The primary counterweight is rotatably supported on the main shaft of a transmission which is operatively coupled to the crankshaft of an engine through a clutch. The primary counterweight has an integral driven sprocket operatively connected through a chain to a drive sprocket integral with the crankshaft. Therefore, the primary counterweight can be rotated in synchronism with the crankshaft.

According to the disclosed counterbalance mechanism, however, driven sprockets dedicated for rotating the counterweight are mounted on the main shaft and countershaft, respectively, and also the drive sprocket dedicated for rotating the counterweight is mounted on the crankshaft. The counterbalance mechanism of such a construction has been an obstacle to efforts to make the internal combustion engine smaller in size and lighter in weight.

Since the drive and driven sprockets and the chain trained therearound are required for rotating the counterweight, the number of components making up the internal combustion engine is large, and the number of steps of assembling the engine is also large. The internal combustion engine is therefore costly to manufacture.

SUMMARY OF THE INVENTION

In view of the above-described drawbacks of the conventional counterbalance mechanism, it is an object of the present invention to provide a counterbalance mechanism which is made up of a reduced number of dedicated parts through utilization of the main shaft of a transmission, for example, so that an internal combustion engine incorporating the counterbalance mechanism is smaller in size and lighter in weight.

Another object of the present invention is to provide a counterbalance mechanism which can reduce a torque applied to the clutch of an internal combustion engine and the main shaft of a transmission.

Still another object of the present invention is to provide a counterbalance mechanism with is constructed of lighter components, allows efficient space utilization, and can be installed with ease.

A further object of the present invention is to provide a counterbalance mechanism with certain parts effectively utilized in operation.

According to the present invention, there is provided a counterbalance mechanism in an internal combustion engine having a crankshaft, a clutch, and a transmission including a main shaft rotatable by the crankshaft through the clutch and a countershaft rotatable by the main shaft through gears, the counterbalance mechanism includes at least a primary counterweight rotatable in synchronism with the crankshaft, and a hollow shaft rotatably supported concentrically on the main shaft, the primary counterweight being integrally mounted on the hollow shaft, the clutch being co-rotatably mounted on the hollow shaft and operatively coupled to the crankshaft at the same speed as and in the opposite direction to the crankshaft.

The counterbalance mechanism further includes a primary driven gear co-rotatably coupled to the clutch and a primary drive gear mounted on the crankshaft and held in mesh with the primary driven gear, whereby the clutch is operatively coupled to the crankshaft through the primary driven and drive gears.

The counterweight is mounted on one end of the hollow shaft, and the clutch is mounted on the other end of the hollow shaft.

The counterweight is integrally mounted on one end of the hollow shaft, and the clutch is fitted over the other end of the hollow shaft, and further includes a case accommodating the transmission therein. The one end of the hollow shaft is housed in the case, while the other end of the hollow shaft projects out of the case.

The counterbalance mechanism further includes another counterweight, and a drive gear for rotating the other counterweight, the drive gear being integrally formed on the hollow shaft.

The other counterweight includes a secondary counterweight.

The counterbalance mechanism further includes a driven gear integral with the secondary counterweight and held in mesh with the drive gear, the primary counterweight being rotatably disposed between the secondary counterweight and the driven gear.

With the above structural arrangement, the primary counterweight is co-rotatably coupled to the clutch through the hollow shaft integral to the primary counterweight, and the clutch is operatively coupled to the crankshaft such that the clutch can be rotated at the same speed as and in the opposite direction to the crankshaft. With the main shaft operatively coupled to the crankshaft through the clutch, the primary counterweight can be rotated at the same speed as and in the opposite direction to the crankshaft. Accordingly, no dedicated drive means for rotating the primary counterweight is required.

As the main shaft of the transmission is rotated with the clutch and the primary counterweight at the same speed as the crankshaft, the clutch and the main shaft are rotated by a relatively small torque.

With the clutch being operatively coupled to the crankshaft through the primary driven gear and the primary drive gear, the rotative power is transmitted from the crankshaft to the hollow shaft and the primary counterweight through the clutch which is a heavy device.

The counterweight and the clutch are mounted respectively on the opposite ends of the hollow shaft By counterbalancing the counterweight and the clutch, the necessary rigidity of the hollow shaft can easily be attained, and the space between the counterweight and the clutch can effectively be utilized.

The counterweight is integrally formed with one end of the hollow shaft housed in the case, and the clutch is fitted over the other end of the hollow shaft projecting out of the case. The counterbalance mechanism is assembled by first placing the hollow shaft integral with the counterweight around the main shaft of the transmission housed in the case, thereafter closing the case, and then fitting the clutch over the end of the hollow shaft which projects out of the case.

The drive gear for rotating the other counterweight is mounted on the hollow shaft. The hollow shaft is therefore effectively used for rotating the other counterweight.

The other counterweight, which is the secondary counterweight, can be operated by the crankshaft through only a pair of gears operatively interconnecting the hollow shaft and the secondary counterweight.

With the primary counterweight being rotatably disposed between the secondary counterweight and the driven gear integral with the secondary counterweight, since the rotating primary counterweight is positioned in the space between the secondary counterweight and the driven gear, that space is effectively utilized, and the total lengths of the counterweights and the drive and driven gears in the longitudinal direction of the main shaft are reduced.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
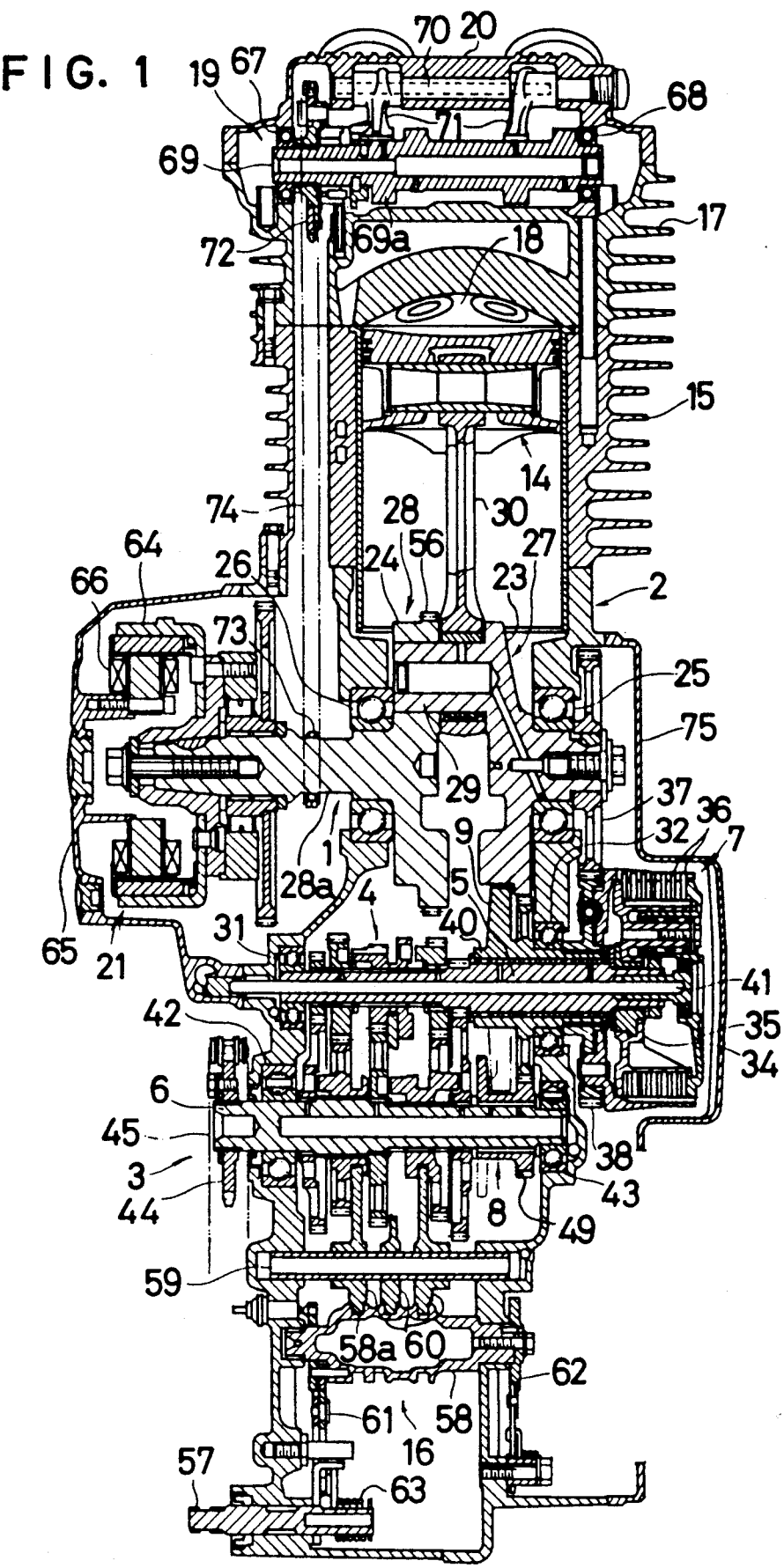
FIG. 1 a vertical cross-sectional view of an internal combustion engine incorporating a counterbalance mechanism according to an embodiment of the present invention.
Figure 2:
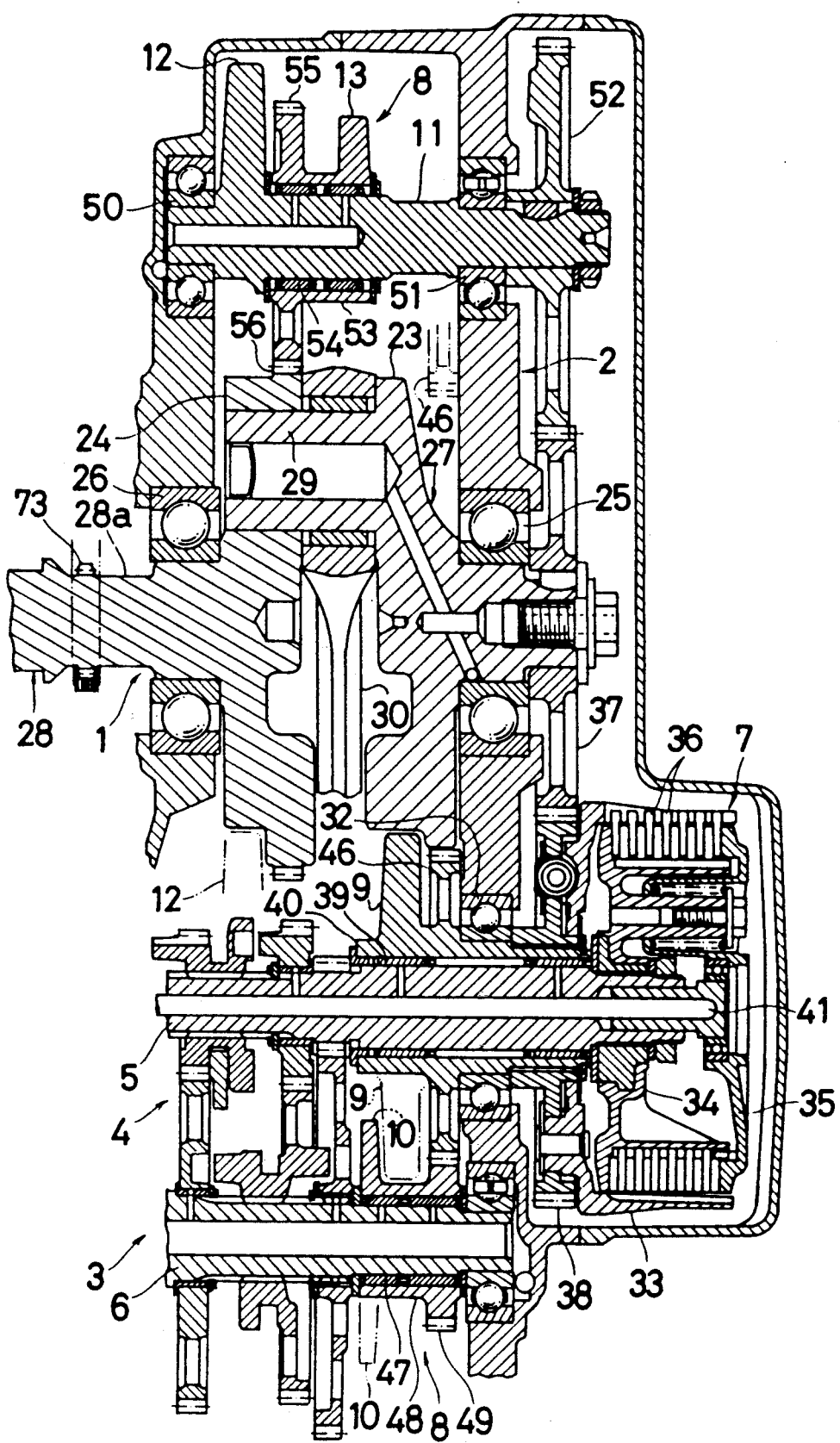
FIG. 2 is a horizontal cross-sectional view of the engine shown in FIG. 1.
Figure 3:
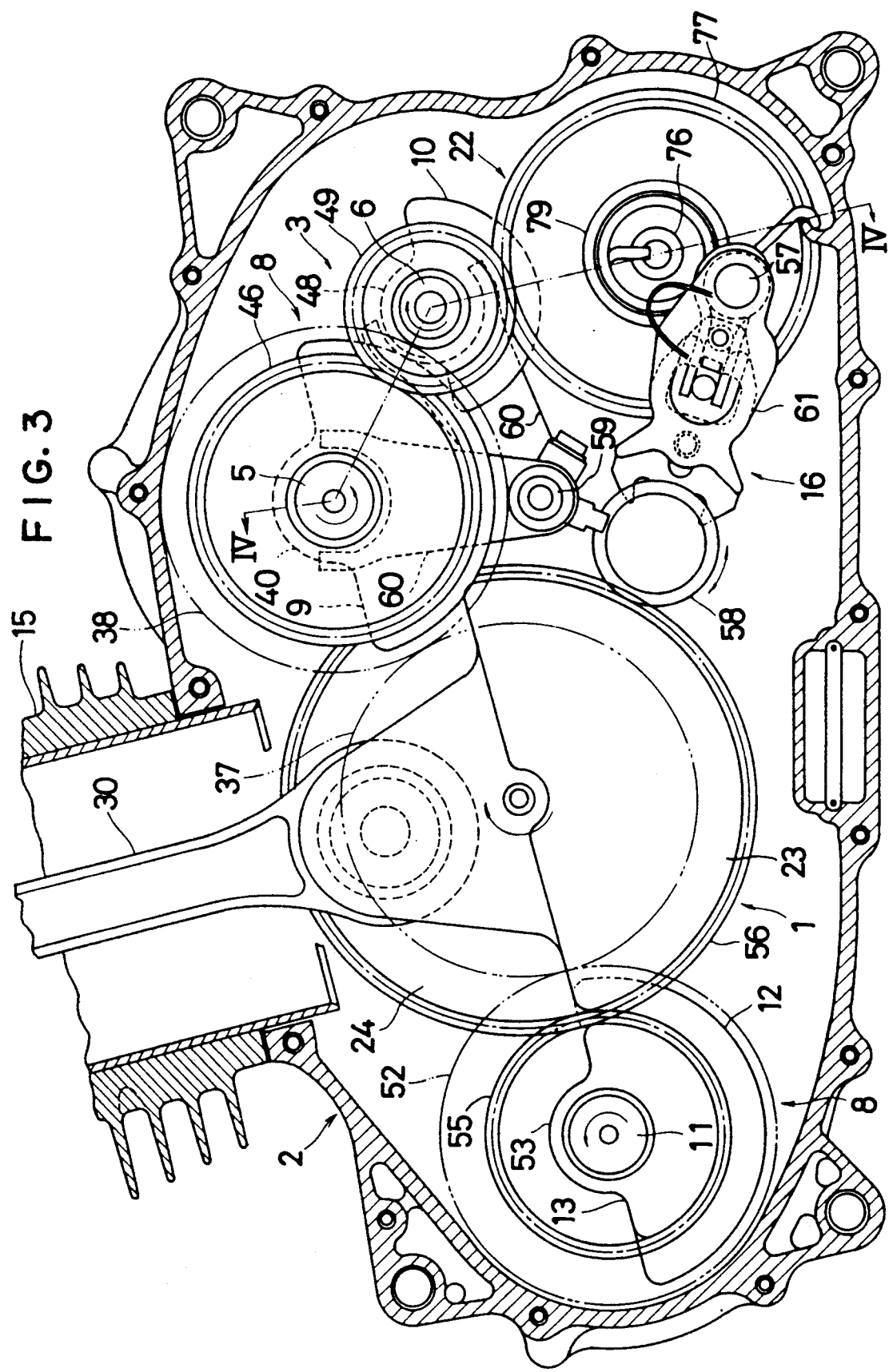
FIG. 3 is an enlarged fragmentary vertical crosssectional view of the engine.

As shown in FIGS. 1 through 3, an internal combustion engine incorporating a counterbalance mechanism according to an embodiment of the present invention has a crankcase 2 in which a crankshaft 1 is rotatably supported, a transmission 3 including a main shaft 5 and a countershaft 6 which are rotatably mounted in the crankcase 2 and operatively coupled to each other through shift gear trains 4, and a clutch 7 disposed outside of the crankcase 2 and mounted on the main shaft 5 of the transmission 3. The counterbalance mechanism, generally denoted as reference number 8, includes a primary counterweight 9 and a secondary counterweight 10 which are disposed in the crankcase 2 and rotatably mounted on the main shaft 5 and the countershaft 6, respectively, an other primary counterweight 12 integrally formed on a balancer shaft 11 rotatably supported in the crankcase 2; and an other secondary counterweight 13 is rotatably mounted on the balancer shaft 11. A piston 14 is slidably disposed in a cylinder block 15 mounted on the crankcase 2. A transmission actuator 16 is disposed in the crankcase 2 for actuating the transmission 3. A cylinder head 17 is mounted on the cylinder block 15 and defines a combustion chamber 18 between itself and the piston 14. The cylinder head 17 has intake and exhaust passages (not shown) communicating with the combustion chamber 18. An intake and exhaust device 19 for supplying intake air into and discharging exhaust gases from the combustion chamber 18 is disposed in a head cover 20 mounted on the cylinder head 17. An electric generator 21 is disposed outside of the crankcase 2 and mounted on one end of the crankshaft 1. The engine can be started by a kick starter 22 (FIG. 4) mounted in the crankcase 2.

As illustrated in FIG. 1, the crankshaft 1 has a pair of axially spaced crank webs 23, 24 disposed in the crankcase 2, and is rotatably supported in the crankcase 2 by means of bearings 25, 26. The crankshaft 1 includes a crankshaft member 27 having the crank web 23 and a crankshaft member 28 having the crank web 24. The crankshaft members 27, 28 are fastened to each other by means of a crankpin 29 integral with the crank web 23 and press-fitted into the crank web 24. The crankpin 29 is connected to the piston 14 by a connecting rod 30. The crankshaft 1 is rotatable about its axis through the crankpin 29 in response to vertical movement of the piston 14 in the cylinder block 15. The crank web 23 has a thin slanted surface facing away from the crankpin 29, defining a space between the crank web 23 and the crankcase 2. The crank web 24 has a recess defined in an outer peripheral surface thereof (which is shown at the lower end of the crank web 24 in FIG. 2). This recess can partly accommodate therein another the primary counterweight 12 as indicated by the imaginary lines in FIG. 2, so that the primary counterweight 12 does not physically interfere with the crank web 24.

The main shaft 5 of the transmission 3 is rotatably supported in the crankcase 2 by means of bearings 31, 32 and extends parallel to the crankshaft 1. The main shaft 5 has an end projecting from the crankcase 2 and on which the clutch 7 is mounted.

As illustrated in FIG. 2, the clutch 7 has a clutch outer member 33 disposed over the projecting end of the main shaft 5 closely to the crankcase 2, and a clutch inner member 34 disposed in the clutch outer member 33 and co-rotatably mounted on the main shaft 5. The clutch outer member 33 can be rotated with the main shaft 5 through a plurality of interleaved clutch plates 36 pressed together between the clutch inner member 34 and a lifter plate 35. A primary driven gear 38 is fixed to the end of the clutch outer member 33 near the crankcase 2. The primary driven gear 38 is held in mesh with a primary drive gear 37 at a gear ratio of 1:1, the primary drive gear 37 being fixedly mounted on the end of the crankshaft 1 projecting from the crankcase 2. The primary driven gear 38 is rotatably mounted on the main shaft 5 by means of a needle bearing 39. The primary driven gear 38 co-rotatably splined to the outer peripheral surface of an end of a first hollow shaft 40 which projects from the crankcase 2, the hollow shaft 40 being interposed between the main shaft 5 and the bearing 32.

When the crankshaft 1 is rotated about its own axis by the piston 14, the clutch outer member 33 and the hollow shaft 40 are rotated about the axis of the main shaft 5 through the primary drive and driven gears 37, 38 at the same speed as and in the opposite direction to the crankshaft 1. The clutch inner member 34 and the main shaft 5 are then rotated about the axis of the main shaft 5 through the pressed clutch plates 36 together with the clutch outer member 33 and the first hollow shaft 40.

As shown in FIG. 1, the clutch 7 has a push rod 41 slidably inserted through the main shaft 5 toward the lifter plate 35 and connected to the lifter plate 35. By operating a clutch actuator (not shown) to move the push rod 41 in a direction to displace the lifter plate 35 away from the clutch inner member 34, the interleaved clutch plates 36 are released from each other, thus disengaging the clutch 7. With the clutch 7 disengaged, the clutch inner member 34 and the main shaft 5 are not rotated.

The countershaft 6 is rotatably supported in the crankcase 2 by means of bearings 42, 43 and extends parallel to the crankshaft 1. The countershaft 6 is operatively coupled to the main shaft 5 through the shift gear trains 4, so that the countershaft 6 may be rotated in interlinked relation to the main shaft at a selected one of several speeds through a selected one of the shift gear trains 4. The countershaft 6 has an end projecting from the crankcase 2 and supporting a drive sprocket 44 which is operatively connected to a road wheel (not shown) through a chain 45. Therefore, rotation of the countershaft 6 is transmitted to the road wheel by the sprocket 44 and the chain 45.

Accordingly, the drive power produced by the engine in response to the vertical movement of the piston 44 is transmitted successively through the crankshaft 1, the clutch 7, and the transmission 3, and then from the countershaft 6 to the road wheel.

The primary counterweight 9 of the counterbalance mechanism 8 is integrally formed with the end of the hollow shaft 40 which is located within the crankcase 2, as better shown in FIG. 2. Therefore, the primary counterweight 9 is rotatable about the axis of the main shaft 5 with the first hollow shaft 40 and the clutch outer member 33 at the same speed as and in the opposite direction to the main shaft 5. Between the primary counterweight 9 and the crankcase 2, there is disposed a drive gear 46 integral with the hollow shaft 40 for rotating the secondary counterweight 10 about the countershaft 6.

The primary counterweight 9 and the drive gear 46 are disposed as closely to the crank web 23 and the crankcase 2 as possible, so that the hollow shaft 40 remains as short as possible. The drive gear 46 is positioned in the space defined between the crank web 23 and the crankcase 2 as indicated by the imaginary lines in FIG. 2 when the crankshaft 1 is rotated 180° from the position of FIG. 2. Thus, the drive gear 46 is kept out of physical interference with the crank web 23.

The imaginary lines 46', 12' in FIG. 2 are used only to show the positions of the drive gear 46 and the primary counterweight 12 with respect to the crank webs 23, 24, but do not indicate the actual positions of the drive gear 46 and the primary counterweight 12.

The secondary counterweight 10 is integrally formed with one end of a second hollow shaft 48 rotatably fitted over the countershaft 6 by means of a needle bearing 47. Therefore, the secondary counterweight 10 is positioned in confronting relation to the countershaft 6 within the crankcase 2. A driven gear 49 integrally formed with the other end of the second hollow shaft 48 is in mesh with the drive gear 46 at a gear ratio of 2:1.

When the crankshaft 1 is rotated about its own axis, the primary counterweight 9 is rotated with the first hollow shaft 40 about the main shaft 5 at the same speed as and in the opposite direction to the crankshaft 1, and the secondary counterweight 10 is rotated about the countershaft 6 through the drive and driven gears 46, 49 at a speed twice the speed of the crankshaft 1 and in the same direction as the crankshaft 1, as shown in FIG. 3. The secondary counterweight 10 and the driven gear 49 are positioned on the second hollow shaft 48 such that when the primary and secondary counterweights 9, 10 are rotated, the primary counterweight 9 is positioned closely between the secondary counterweight 10 and the driven gear 49. Accordingly, the second hollow shaft 48 also remains as short as possible.

As illustrated in FIG. 2, the balancer shaft 11 of the counterbalance mechanism 8 is rotatably supported in the crankcase 2 by means of bearings 50, 51 in a position opposite to the main shaft 5 across the crankshaft 1, the balancer shaft 11 extending parallel to the crankshaft 1. The another primary counterweight 12 is integrally formed with one end of the balancer shaft 11 within the crankcase 2. The other end of the balancer shaft 11 projects from the crankcase 2 and supports thereon a driven gear 52 which is rotatably mounted on the balancer shaft 11 and held in mesh with the primary drive gear 37 at a gear ratio of 1 : 1.

The an other secondary counterweight 13 is integrally formed with one end of a third hollow shaft 53 which is rotatably fitted by a needle bearing 54 over an intermediate portion of the balancer shaft 11 within the crankcase 2. A driven gear 55 integrally formed with the other end of the third hollow shaft 53 is held in mesh with a drive gear 56 at a gear ratio of 2 : 1, the drive gear 56 being integrally formed with the outer peripheral surface of the crank web 24.

Upon rotation of the crankshaft 1, as shown in FIG. 3, the an other primary counterweight 12 is rotated with the balancer shaft 11 through the primary drive gear 37 and the driven gear 52 at the same speed as and in the opposite direction to the crankshaft 1, and the an other secondary counterweight 13 is rotated with the third hollow shaft 53 about the balancer shaft 11 through the drive and driven gears 56, 55 at a speed twice the speed of the crankshaft 1 and in the opposite direction to the crankshaft 1.

While the engine is in operation, the primary vibration of the engine is reduced by rotating the pair of primary counterweights 9, 12 at the same speed as and in the opposite direction to the crankshaft 1, and the secondary vibration of the engine is reduced by rotating the secondary counterweights 10, 13 at the speed twice that of the crankshaft 1 and respectively in the same direction as and the opposite direction to the crankshaft 1.

As shown in FIG. 2, a straight line passing through the centers of rotation of the primary counterweights 9, 12 of the counterbalance mechanism 8 passes substantially through a central point intermediate between the crank webs 23, 24 of the crankshaft 1; i.e., the primary counterweights 9, 12 are positioned at substantially equal distances from the central point between the crank webs 23, 24. The primary counterweights 9, 12 thus positioned are effective in canceling out the moment which would otherwise act on the crankshaft 1, thereby allowing the crankshaft 1 to rotate smoothly.

As shown in FIG. 1, the transmission actuator 16 includes a spindle 57 rotatably supported in a side wall of the crankcase 2, a shift drum 58 rotatably supported in the crankcase 2, and a plurality of shift forks 60 slidably fitted over a shift fork shaft 59 supported in the crankcase 2 parallel to the main shaft 5 and the countershaft 6. The shift forks 60 engage the shift gear trains 4 of the transmission 3, as shown in FIGS. 1 and 3, and engage in guide grooves 58a defined in the outer peripheral surface of the shift drum 58, as shown in FIG. 1. As illustrated in FIGS. 1 and 3, the shift drum 58 is linked to the spindle 57 through a link arm 61 corotatably mounted on the end of the spindle 57 in the crankcase 2, so that the shift drum 58 can be turned about its own axis in response to angular movement of the link arm 61 which is caused by the turning of the spindle 57. As shown in FIG. 1, the shift drum 58 has an end projecting out of the crankcase 2 and coupled to a stopper 62 disposed outside of the crankcase 2. The shift drum 58 is angularly movable through steps defined by the stopper 62.

The transmission actuator 16 operates in the same manner as the known transmission actuators. When a gearshift lever (not shown) coupled to the end of the spindle 57 outside of the crankcase 2 is operated upon, the shift drum 58 is angularly moved stepwise through the link arm 61. At this time, the shift forks 60 are guided by the guide grooves 58a of the shift drum 58 to slide the shift fork shaft 59 in its axial direction. Some of the gears of the shift gear trains 4 are moved axially along the main shaft 5 or the countershaft 6 to establish a different combination of meshing gears of the shift gear trains 4. Therefore, rotative power is transmitted from the main shaft 5 to the countershaft 6 through the newly established gear combination.

After the spindle 57 has turned through a predetermined angle, it is moved back to its original position by a return spring 63 acting on the spindle end in the crankcase 2.

As shown in FIG. 1, the electric generator 21 comprises a flywheel 64 disposed remotely from the clutch 7 and corotatably mounted on an end of the crankshaft member 28 which projects from the crankcase 2, and a stator 66 fixed to an inner surface of a generator cover 65 mounted on the crankcase 2 and housed in the flywheel 64. When the crankshaft 1 is rotated, the flywheel 64 rotates with the crankshaft 1 around the stator 66 to generate electric power which is supplied to a battery (not shown) to charge the same.

The intake and exhaust device 19 has a camshaft 69 rotatably supported between the cylinder head 17 and the head cover 20 by means of bearings 67, 68, and a plurality of rocker arms 71 swingably supported on a rocker arm shaft 70 disposed in the head cove 20 and extending parallel to the camshaft 69. A cam driven gear 72 corotatably mounted on an end of the camshaft 69 is operatively coupled by a chain 74 to a cam drive gear 73 on the outer peripheral surface face of a smaller-diameter portion 28a of the crankshaft member 28, the cam drive gear 73 being positioned between the generator 21 and the crankcase 2. Therefore, the camshaft 69 can be rotated about its own axis by the rotation of the crankshaft 1. The rocker arms 71 engage respective cams 69a on the camshaft 69 and also intake and exhaust valves (not shown) which selectively open and close the intake and exhaust passages communicating with the combustion chamber 18.

Upon rotation of the camshaft 69 in synchronism with the rotation of the crankshaft 1, the intake and exhaust valves are opened and closed through the rocker arms 71 to introduce intake air into and discharge exhaust gases from the combustion chamber 18.

Figure 4:
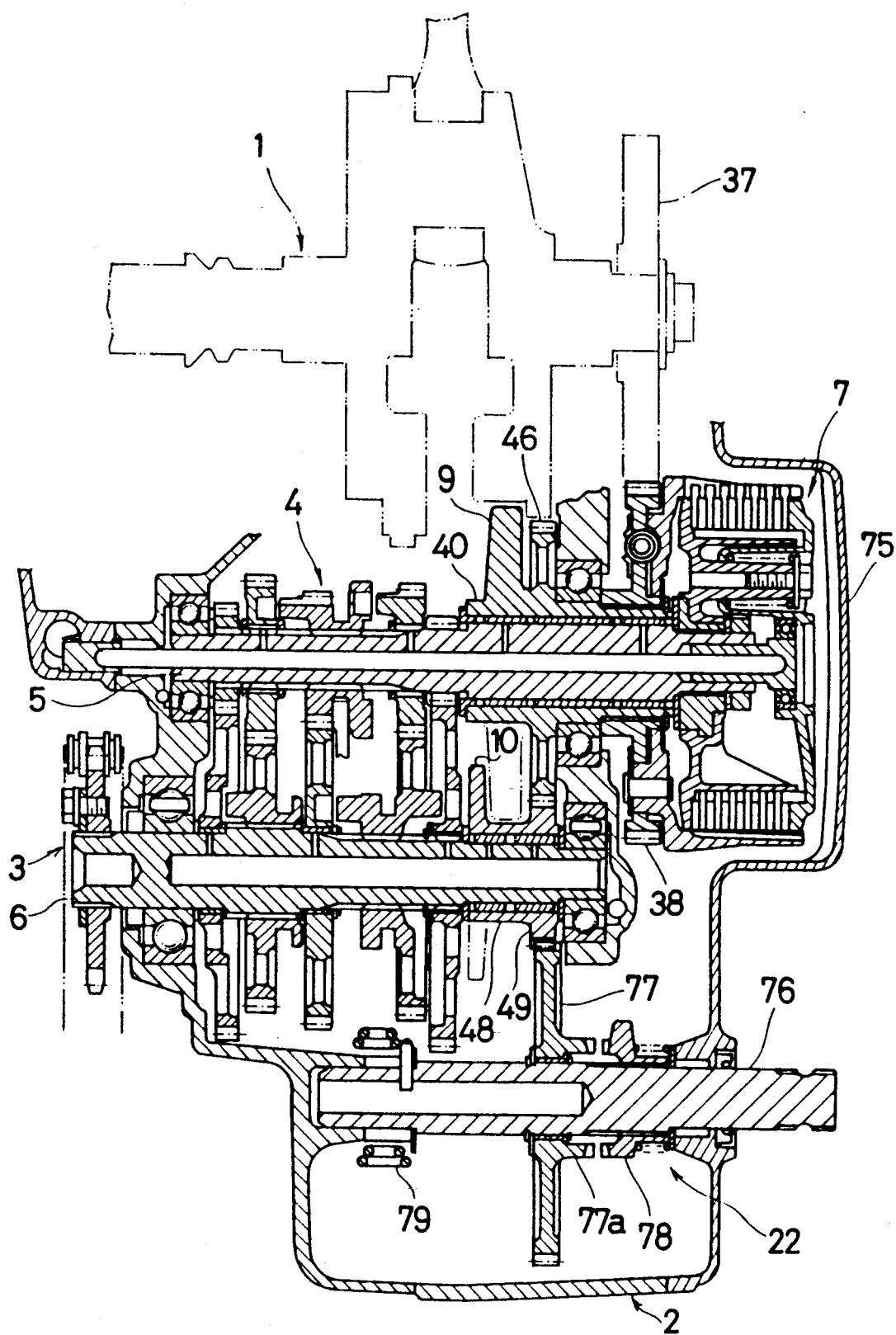
FIG. 4 a cross-sectional view taken along line IV—IV of FIG. 3.

As shown in FIG. 4, the kick starter includes a starter spindle 76 rotatably supported in the crankcase 2 and a clutch cover 75 mounted on the crankcase 2, and a starter gear 77 rotatably supported on an intermediate portion of the starter spindle 76 in the crankcase 2. The starter gear 72 is held in mesh with the driven gear 49 of the second hollow shaft 48 which has the an other secondary counterweight 10. The starter gear 7/ has a ratchet wheel 77a on its end facing the clutch cover 75. A drive ratchet 78 corotatably and axially slidably fitted over the starter spindle 76 is positioned between the starter gear 77 and the clutch cover 75, the drive ratchet 78 being normally urged away from the ratchet wheel 77a.

When a kick pedal (not shown) coupled to the starter spindle 76 outside of the clutch cover 75 is pressed down, the drive ratchet 78 is slid axially into engagement with the ratchet wheel 77a of the starter gear 77, and the starter spindle 76 is turned about its own axis with the drive ratchet 78. The starter gear 77 is now turned about its own axis to turn the second hollow shaft 48. The second hollow shaft 48 then rotates the crankshaft 1 in the same direction, thereby moving the piston 14 to start the engine.

After the starter spindle 76 has turned through a predetermined angle, it returns to its original angular position under the bias of a return spring 79 acting on the end of the starter spindle 76 within the crankcase 2.

The counterbalance mechanism 8 according to the present invention will be described in greater detail with reference to FIG. 2.

The primary and secondary counterweights 9, 10 are rotatably mounted respectively on the main shaft 5 and the countershaft 6 through the respective first and second hollow shafts 40, 48. The main shaft 5 and the countershaft 6 therefore serve as balancer shafts supporting these primary and secondary counterweights 9, 10. The 570 an other primary and secondary counterweights 12, 13 are mounted on the single balancer shaft 11. Therefore, the dedicated balancer shaft is only the balancer shaft 11, resulting in a reduction in the number of parts of the counterbalance mechanism 8.

The primary counterweight is operatively coupled to the crankshaft 1 through the primary drive gear 37, the primary driven gear 38, and the clutch 7, which constitute a drive means for rotating the main shaft 5 of the transmission 3, and also through the first hollow shaft 40. As no dedicated drive means for rotating the primary counterweight 9 is required, the number of parts of the counterbalance mechanism 8 is also reduced.

The space around the first hollow shaft 40 is effectively utilized by the drive gear 46 which is integrally formed with the first hollow shaft 40 between the primary counterweight 9 and the clutch 7 at the opposite ends of the first hollow shaft 10. Furthermore, the secondary counterweight 40 of the second hollow shaft 48 on the countershaft 6 is rotated by the drive gear 46. With this arrangement, the first and second hollow shafts 40, 48 are effectively utilized in operation, minimizing the number of dedicated parts of the counterbalance mechanism 8.

Since the primary counterweight 9 and the clutch 7 are disposed at the opposite ends of the first hollow shaft 40, they counterbalance each other and the first hollow shaft 40 remains highly rigid. The first hollow shaft 40 is therefore highly rigid and compact, and lightweight and small in size.

The primary counterweight 9 and the clutch 7 are rotatable in unison with each other, and the gear ratio between the primary drive gear 37 and the primary driven gear 38 is 1 : 1. Consequently, when the crankshaft 1 is rotated, the torque applied to the clutch 7 and the main shaft 5 is small, and the mechanical strength required of the clutch 7 and the main shaft 5 may be reduced. The clutch 7 and the main shaft 5 are accordingly relatively compact, small in size, and light in weight.

As described above, the number of dedicated parts of the counterbalance mechanism is reduced as much as possible, and the first and second hollow shafts 40, 48 having the primary and secondary counterweights 9, 10, respectively, are effectively utilized in space and operation, and lightweight and small in size. Accordingly, the engine incorporating the counterbalance mechanism is of a reduced size and less heavy.

In the illustrated embodiment, the primary counterweight 9 is integrally formed with the first hollow shaft 40, and the clutch 7 is splined to the first hollow shaft 40. However, the primary counterweight 9 may be splined to the first hollow shaft 40, and the clutch 7 may be integrally formed with the first hollow shaft 40. With the arrangement of the present invention, the first hollow shaft 4 and the clutch 7 can be installed in position with ease, as described below.

The crankcase 2 is divided into two lefthand and righthand members along a plane which lies substantially along the connecting rod 30. To install the clutch 7 and the first hollow shaft 40, while the member of the crankcase 2 on the clutch side (i.e., the righthand member as viewed in FIG. 1) is detached, the first hollow shaft 40 integral with the primary counterweight is placed over the main shaft 5. Then, the crankcase member is attached, and the clutch 7 is mounted on the first hollow shaft 40 and the main shaft 5.

Even if the crankcase 2 is divided into upper and lower members along a plane lying along the main shaft 5, the clutch 7 can be installed after the crankcase members have been mounted in place. Therefore, the clutch 7 can be installed in place without any trouble.

Since the clutch 7, the first hollow shaft 40, and the crankcase 2 can be individually installed on the engine, they can be assembled together relatively easily.

A counterbalance mechanism according to another embodiment will be described below with reference to FIGS. and 6.

Figure 5:
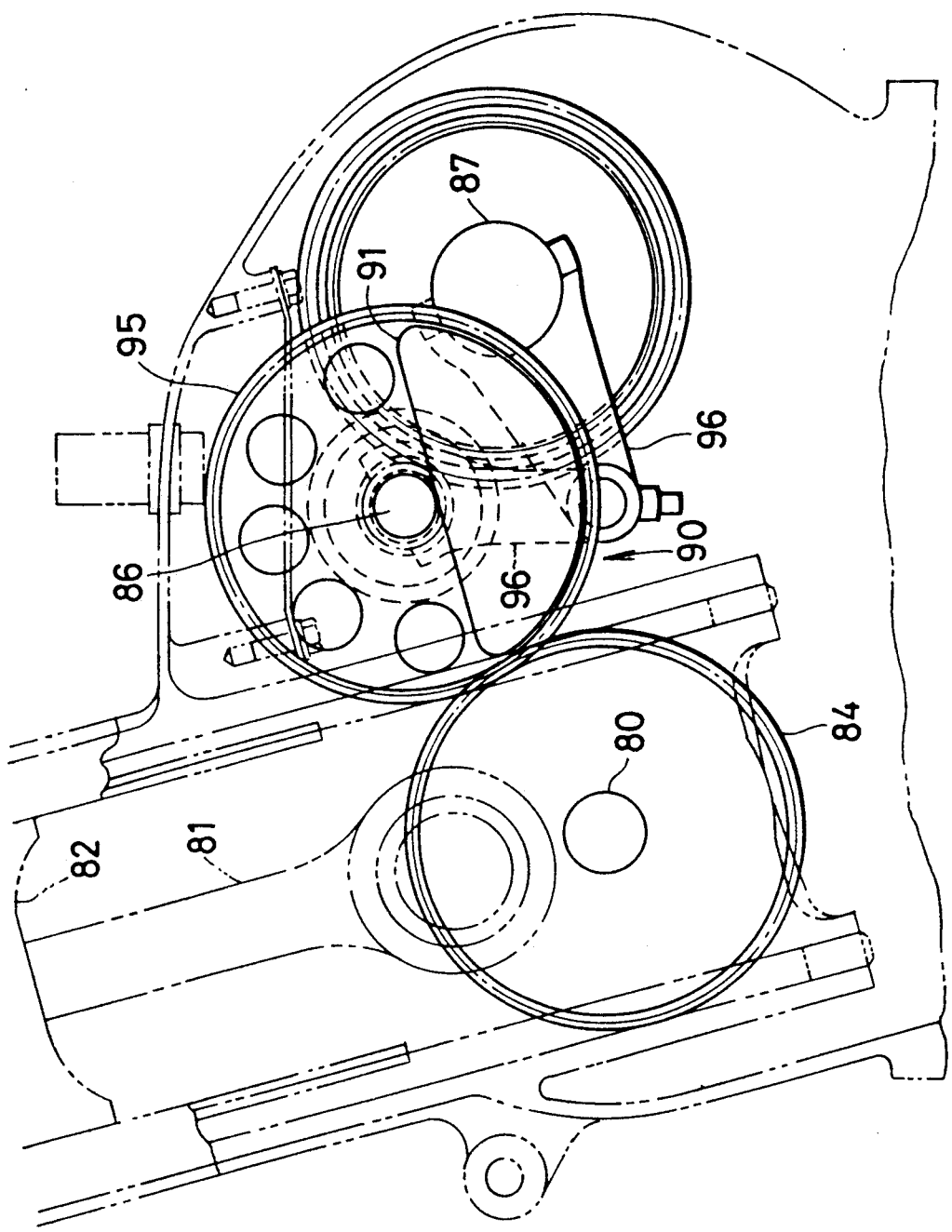
FIG. 5 is a schematic fragmentary side elevational view of an internal combustion engine having a counterbalance mechanism according to another embodiment of the present invention.
Figure 6:
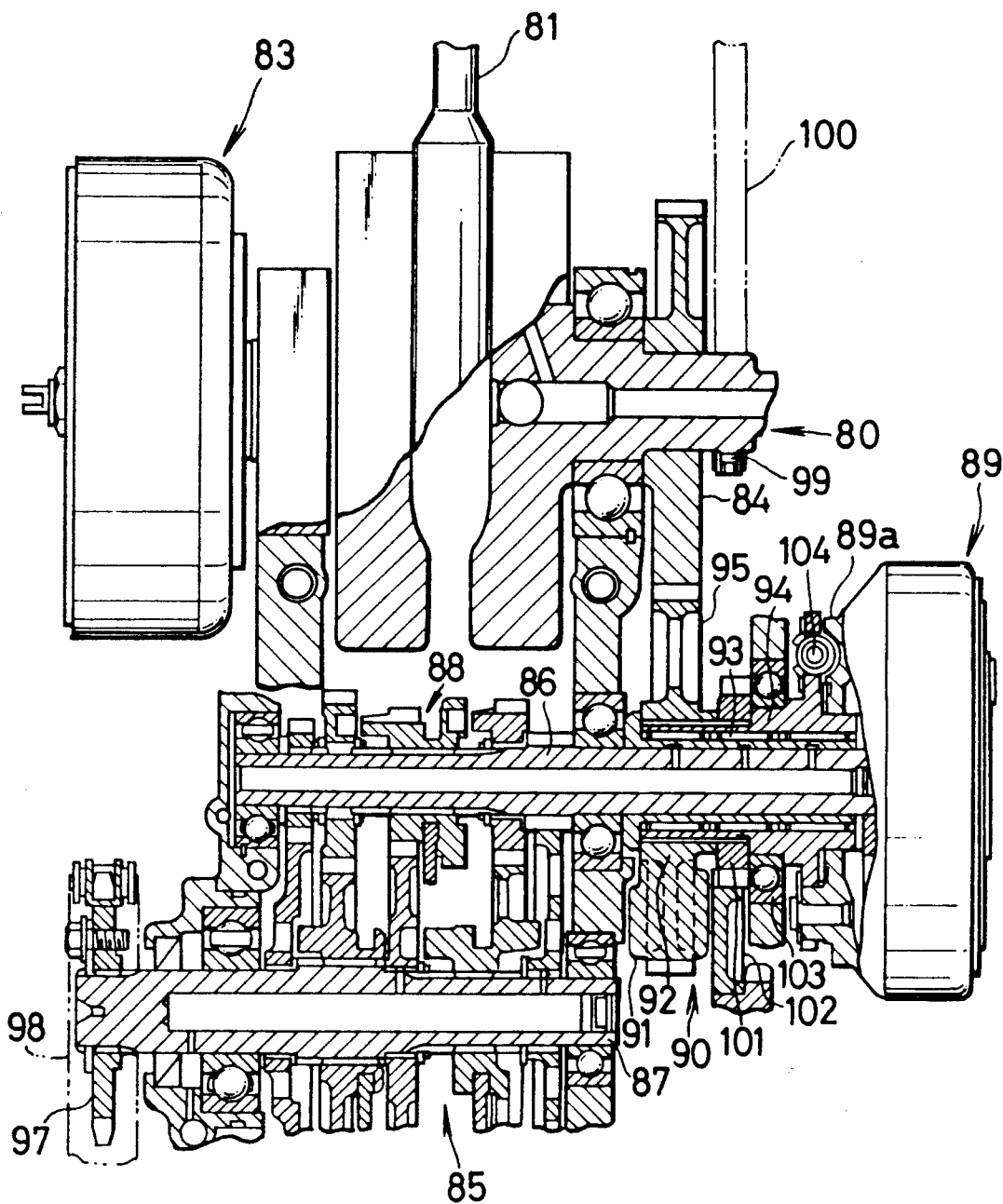
FIG. 6 is a fragmentary vertical cross-sectional view of the in FIG. 5.

An internal combustion engine incorporating the counterbalance mechanism shown in FIGS. 5 and 6 is basically of the same construction as that of the engine shown in FIG. 1. As illustrated in FIG. 5, a crankshaft 80 is operatively connected to a piston 82 through a connecting rod 81. As shown in FIG. 6, an electric generator 83 and a primary drive gear 84 are attached respectively to the opposite ends of the crankshaft 80. As illustrated in FIG. 6, a transmission 85 has a main shaft 86 and a countershaft 87 which are operatively coupled to each other through shift gear trains 88. A clutch 89 is mounted coaxially on an end of the main shaft 86. A counterbalance mechanism 90 includes a primary counterweight 91 integrally formed with a hollow shaft 92 which is disposed around the end of the main shaft 86 inwardly of the clutch 89.

The hollow shaft 92 is splined to the outer peripheral surface of an end of a sleeve 94 that is concentrically disposed over the end of the main shaft 86 and rotatably supported on the main shaft 86 by means of a needle bearing 93. The hollow shaft 92 and the sleeve 94 are therefore rotatable around the main shaft 86. The clutch 89 includes a clutch outer member 89a fixedly mounted on the other end of the sleeve 94. The hollow shaft 92 and the clutch 89 are rotatable in unison with each other around the main shaft 86 through the sleeve 94. A primary driven gear 95 is integrally formed with the hollow shaft 92 concentrically with the main shaft 86. The primary driven gear 95 is held in mesh with the primary drive gear 84 at a gear ratio of 1 1.

In FIG. 5, shift forks 96 engage the shift gear trains 88 (FIG. 6). As shown in FIG. 6, a drive sprocket 97 is mounted on an end of the countershaft 87 and operatively coupled to a road wheel (not shown) through a chain 98. A drive gear 99 is mounted on the crankshaft 80 for operating an intake and exhaust device (not shown) through a chain 100. A driven gear 101 is fitted over the sleeve 94 and held in mesh with a kick starter drive gear 102. An intermediate portion of the sleeve 94 is rotatably supported by a bearing 103. A damper spring 104 is disposed between the sleeve 94 and the clutch outer 89a.

When the crankshaft 80 is rotated about its own axis in response to movement of the piston 82, the primary driven gear 95, the hollow shaft 92, and the primary counterweight 91 are rotated about the main shaft 86 through the primary drive gear 84. At the same time, the clutch 89 and the main shaft 86 are rotated about the axis of the main shaft 86 through the sleeve 94. The countershaft 87 is also rotated through the shift gear trains 88, thereby transmitting drive power from the engine to the road wheel. Since the primary drive gear 84 and the primary driven gear 95 are held in mesh with each other at a gear ratio of 1 : 1, the primary counterweight 91, the hollow shaft 92, and the clutch 89 are rotated at the same speed as and in the opposite direction to the crankshaft 80, thereby reducing primary vibration of the engine.

Since no specially dedicated drive means for rotating the primary counterweight 91 is required, the number of components of the counterbalance mechanism 90 is reduced, and the counterbalance mechanism 90 is light in weight and small in size.

Inasmuch as the gear ratio between the primary drive and driven gears 84, 95 is 1 : 1, the torque imposed on the clutch 89 and the main shaft 86 is small, and the mechanical strength required of the clutch 89 and the main shaft 86 may be reduced. The clutch 89 and the main shaft 86 are therefore small in size, and light in weight.

As shown in FIG. 6, the driven gear 101, the ball bearing 103, and the damper spring 104 are disposed between the clutch 89 and the primary driven gear 95. Thus, the space between the clutch 89 and the primary driven gear 95 is effectively utilized.

Figure 7:
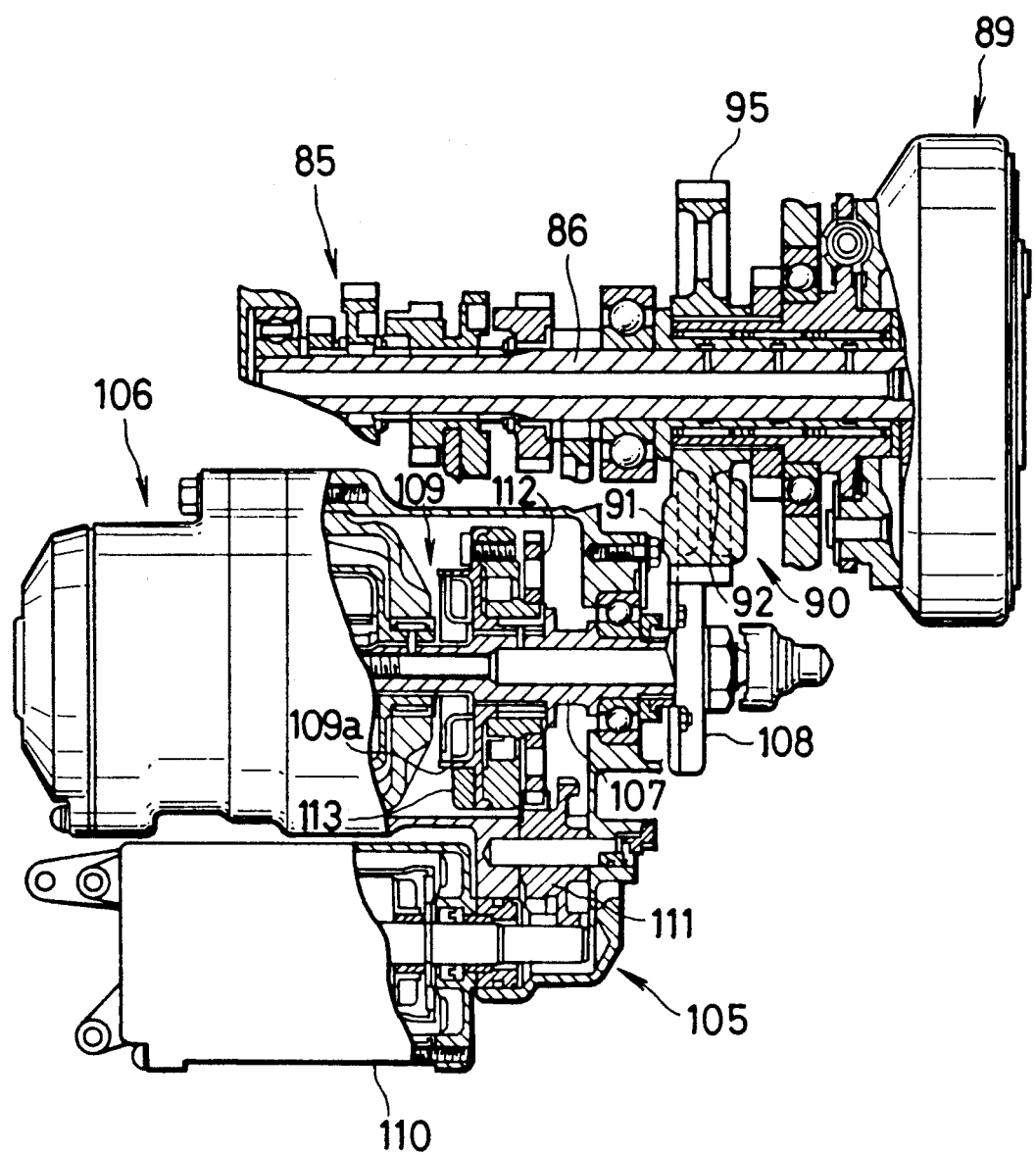
FIG. 7 is a fragmentary vertical cross-sectional view of an internal combustion engine having a counterbalance mechanism according to still another embodiment of the present invention.

FIG. 7 shows a counterbalance mechanism according to still another embodiment of the present invention. An internal combustion engine incorporating the counterbalance mechanism is basically the same as the engine shown in FIGS. 5 and 6. Those parts of the engine of FIG. 7 which are identical to those shown in FIGS. 5 and 6 are denoted by identical reference numerals.

The engine shown in FIG. 7 is combined with the transmission 85 including the main shaft 86, the clutch 89, the primary driven gear 95 coupled to the clutch 89 and a crankshaft (not shown), and the counterbalance mechanism 90 having the hollow shaft 92 and the primary counterweight 91, which are integral with the primary driven gear 95. The above-described devices and members are of the same construction as that shown in FIG. 6. The engine is also associated a device, such as with a self starter 105 and an intermediate shaft 107 with an electric generator 106 mounted on one end thereof. The other end of the intermediate shaft 107 is coupled to the clutch 89 through a shaft or starter drive gear 108 that is held in mesh with the primary driven gear 95 at a gear ratio of 2 : 1.

The self starter 105 has a member or starter clutch 109 corotatably mounted on a substantially central portion of the intermediate shaft 107. The starter clutch 109 is operatively coupled to a starter motor 110 of the self starter 105 through a drive gear 111 and a driven gear 112.

The counterbalance mechanism 90 which has the primary counterweight 91 also has a secondary counterweight 113 integral to a housing 109a of the starter clutch 109.

When the starter motor 110, is energized, the intermediate shaft 107 is successively rotated through the drive gear 111, the driven gear 112, and the starter clutch 109, and the crankshaft is rotated through the starter drive gear 108 and the primary driven gear 95 to start the engine. When the engine is operated, the crankshaft is rotated to cause the primary driven gear 95, the clutch 89, and the starter drive gear 108 to rotate the intermediate shaft 107. Since the gear ratio between the primary driven gear 95 and the starter drive gear 108 is 2 : 1, the intermediate gear 107 is rotated at a speed twice that of the crankshaft. Therefore, the secondary counterweight 113 is rotated with the housing 109a at a speed twice that of the crankshaft, thereby reducing secondary vibration of the engine.

In this embodiment, the secondary counterweight 113 is integrally coupled to the housing 109a of the starter clutch 109, and is rotated when the engine is in operation. Inasmuch as no dedicated drive means for the secondary counterweight 113 is therefore not needed, the number of parts of the counterbalance mechanism 90 is reduced, and the counterbalance mechanism 90 is lightweight and small in size.

With the present invention, as described above, the counterweight is integrally formed with the hollow shaft rotatably supported on the main shaft of the transmission, and the clutch is co-rotatably mounted on the hollow shaft. Therefore, the counterweight is operated by the crankshaft through the drive means for the clutch through which the main shaft can be operated by the crankshaft. Therefore, since there is not required any drive means dedicated for rotating the countershaft, the number of components of the counterbalance mechanism is reduced, and the engine is light in weight and small in size.

As the main shaft of the transmission is rotated with the clutch at the same speed as the crankshaft, the torque applied to the clutch and the main shaft is small. Consequently, the mechanical strength required of the transmission and the clutch may be reduced, and they may be small in size and light in weight.

With the clutch being operatively coupled to the crankshaft through the primary driven gear and the primary drive gear, since the rotative power is transmitted from the crankshaft to the hollow shaft through the clutch which is a heavy device rotating with the hollow shaft, the hollow shaft is not twisted by the rotative power from the crankshaft, and may be of a low mechanical strength.

The counterweight and the clutch are mounted respectively on the opposite ends of the hollow shaft that is rotatably supported on the main shaft. By counterbalancing the counterweight and the clutch, the necessary rigidity of the hollow shaft can easily be attained, and the hollow shaft may be compact, light, and small. Moreover, the space between the counterweight and the clutch can effectively be utilized.

The counterweight is integrally formed with one end of the hollow shaft housed in the case, and the clutch is fitted over the other end of the hollow shaft projecting out of the case. This arrangement allows the counterweight, the case, and the clutch to be easily installed separately on the internal combustion engine.

The drive gear for rotating the other counterweight is mounted on the hollow shaft. The hollow shaft is therefore effectively used as the drive means for rotating the other counterweight. No dedicated drive means is thus required for rotating the other counterweight, and the number of parts of the counterbalance mechanism is reduced.

The other counterweight, which is the secondary counterweight, can be operated by the crankshaft through only a pair of gears operatively coupled to the hollow shaft, thereby reducing secondary vibration of the engine.

With the primary counterweight being rotatably disposed between the secondary counterweight and the driven gear integral with the secondary counterweight, the space between the secondary counterweight and the driven gear is effectively utilized, and the total lengths of the counterweights and the drive and driven gears in the longitudinal direction of the main shaft are reduced. Therefore, the counterbalance mechanism is small in size, and the length of the main shaft which supports the primary counterweight and the drive gear is reduced. The internal combustion engine may therefore be reduced in size and weight.

Although certain preferred embodiments have been shown and described, it should be understood that many changes and modifications may be made therein without departing from the scope of the appended claims.

What is claimed is:

1. A counterbalance mechanism in an internal combustion engine having a crankshaft, a clutch, and a transmission including a main shaft rotatable by the crankshaft through the clutch and a countershaft rotatable by the main shaft through gears, said counterbalance mechanism comprising:
    at least a primary counterweight rotatable in synchronism with the crankshaft;
    a hollow shaft rotatably supported concentrically on the main shaft,
    said primary counterweight being integrally formed with said hollow shaft; and
    said clutch being co-rotatably mounted on said hollow shaft and operatively coupled to the crankshaft at the same speed as and in the opposite direction to the crankshaft.

2. A counterbalance mechanism according to claim 1, further including a primary driven gear corotatably coupled to said clutch and a primary drive gear mounted on the crankshaft and held in mesh with said primary driven gear, whereby the clutch is operatively coupled to the crankshaft through said primary driven and drive gears.

3. A counterbalance mechanism according to claim 1, wherein said counterweight is mounted on one end of said hollow shaft, and the clutch is mounted on the other end of said hollow shaft.

4. A counterbalance mechanism according to claim 1, wherein said counterweight is integrally mounted on one end of said hollow shaft, and the clutch is fitted over the other end of said hollow shaft, further including a case accommodating the transmission therein, said one end of the hollow shaft being housed in said case, said other end of the hollow shaft projecting out of said case.

5. A counterbalance mechanism according to claim 1, further including an other counterweight, and a drive gear for rotating said other counterweight, said drive gear being integrally formed on said hollow shaft.

6. A counterbalance mechanism according to claim 5, wherein said other counterweight comprises a secondary counterweight.

7. A counterbalance mechanism according to claim 6, further including a driven gear integral with said secondary counterweight and held in mesh with said drive gear, said primary counterweight being rotatably disposed between said secondary counterweight and said driven gear.

8. A counterbalance mechanism according to claim 1, wherein said primary counterweight is integrally formed on said hollow shaft.

9. A counterbalance mechanism according to claim 1, further including a primary drive gear mounted on the crankshaft shaft and held in mesh with said primary drive gear operably coupling the crankshaft and said clutch, said primary counterweight being integrally formed with said primary driven gear.

10. A counterbalance mechanism according to claim 9, wherein the engine further includes an intermediate shaft adjacent the main shaft, a shaft drive gear mounted on said intermediate shaft in mesh with said primary driven gear, and a device including a member mounted on said intermediate shaft, said counterbalance mechanism further including a secondary counterweight non-rotatably mounted on said member of said device.

* * * * *